Patented Apr. 25, 1933

1,905,536

UNITED STATES PATENT OFFICE

CHARLES S. WEBBER, OF SPRINGFIELD, MASSACHUSETTS, AND CYRIL J. STAUD, OF ROCHESTER, NEW YORK, ASSIGNORS TO EASTMAN KODAK COMPANY, OF ROCHESTER, NEW YORK, A CORPORATION OF NEW YORK

PROCESS FOR THE HYDROLYSIS OF CELLULOSE ACETATE

No Drawing. Application filed December 14, 1929. Serial No. 414,207.

This invention relates to a process for the hydrolysis of cellulose acetate and particularly to the hydrolysis of cellulose acetate in the presence of B B' dichlordiethyl ether.

Cellulose triacetate is prepared in two states,—the fibrous state which is obtained by the acetylation of cellulose in a bath which is a non-solvent for the cellulose triacetate formed,—the dissolved state, that is, a cellulose acetate produced in a solution which is a solvent for the cellulose triacetate formed. In either form cellulose triacetate is not extensively used in the arts, it being necessary first to deacetylate the cellulose sufficiently and thereby change its solubility to such an extent that the resulting product is soluble in acetone or other solvent. It has been known that the acetone soluble type cellulose acetate has very desirable properties from the standpoint of viscosity, flexibility and durability.

Heretofore, cellulose triacetate has generally been hydrolyzed to the desired solubility which is generally acetone solubility by treating the acetate in a hydrolyzing bath containing a hydrolyst, a catalyst and a solvent which dissolves all of the ingredients contained therein. Acetic acid has been used almost exclusively for this purpose and serves admirably for the hydrolysis of the cellulose acetate. Owing to the extensive use, however, of cellulose acetate which requires in its manufacture a considerable amount of acetic acid and also because of other important technical uses for this acid its availability of late years has been limited. The advisability thereof of providing a solvent which has the advantages of acetic acid and which does not in itself degrade to any extent the acetone soluble cellulose acetate produced has been sought by investigators in this field.

An object of the present invention is to provide a process for the hydrolysis of cellulose triacetate to a cellulose acetate soluble in acetone. A further object of this invention is to provide a process for the hydrolysis of chloroform soluble cellulose triacetate to an acetone soluble cellulose acetate by conducting the deacetylation in the presence of B B' dichlordiethyl ether. Other objects will hereinafter appear.

We have found that B B' dichlordiethyl ether is an excellent medium in which the hydrolysis of cellulose triacetate may be conducted. This compound alone is not a solvent for cellulose triacetate either of the fibrous or non-fibrous form but in the presence of glacial acetic acid it becomes a solvent of both the cellulose triacetate and the cellulose acetate of the acetone soluble variety. Its use, therefore, in the hydrolyzing bath has many important advantages as it dissolves not only the starting but the finished acetate as well as hydrating reagents such as acids, acid salts or alkali and is miscible with hydrolysts and particularly with water to the extent of 10 per cent in the presence of 10 volume percent of acetic acid. While its solvent power is dependent upon the acetic acid or other lower aliphatic organic acid present its employment greatly decreases the amounts of the acid required.

Hydrolysis in the presence of B B' dichlordiethyl ether is preferably conducted at a temperature of 45 to 50° C. or thereabouts and requires a period of approximately 24 hours to change the solubility of the cellulose triacetate through chloroform solubility to a solubility in acetone. The B B' dichlordiethyl ether which has a boiling point of 175° C. may be separated from the hydrolyzed cellulose acetate by precipitation or by injecting steam into the hydrolyzing bath which distills over the B B' dichlordiethyl ether and coagulates from the solution the cellulose acetate. Precipitation may likewise be carried out by the addition of the hydrolyzing bath to a known coagulating bath comprising, for example, ether or mixtures of ether with carbon tetrachloride.

We shall now give a method of carrying out our invention but it will be understood that we are not to be restricted by the proportion therein given except as they are indicated in the appended claims.

50 parts of cellulose triacetate are dissolved in a solution containing 150 parts of B B' dichlordiethyl ether, 150 parts of acetic acid and 2 parts of hydrochloric acid and 5 parts of $H_2O$. The resulting solution is maintained in a suitable closed container at a temperature of 45 to 50° C. and after a period of 18 to 24 hours an acetone soluble product will be produced.

Various changes may be made in the proportions of B B' dichlordiethyl ether and acetic acid that is employed for hydrolysis of the cellulose triacetate, provided the proportion of acetic acid to B B' dichlordiethyl ether be not less than 1 to 4 parts respectively, or in the type of catalysts or hydrolysts that may be present in the solution without in any way departing from this invention or sacrificing any of its advantages.

What we claim as our invention and desire to be secured by Letters Patent of the United States is:

1. In the process for the production of acetone-soluble cellulose acetate the step which comprises hydrolyzing an acetic acid solution of cellulose acetate in the presence of B B' dichlordiethyl ether.

2. In the process for the production of acetone-soluble cellulose acetate the step which comprises hydrolyzing an acetic acid solution of cellulose acetate in the presence of B B' dichlordiethyl ether and water.

3. In the process for the production of acetone-soluble cellulose acetate the step which comprises hydrolyzing an acetic acid solution of cellulose acetate in the presence of B B' dichlordiethyl ether, water and a mineral acid catalyst.

4. In the process for the production of acetone-soluble cellulose acetate the step which comprises hydrolyzing an acetic acid solution of cellulose acetate in the presence of B B' dichlordiethyl ether, water, and hydrochloric acid until an acetone soluble cellulose acetate is obtained and separating the B B' dichlordiethyl ether therefrom by steam distillation.

Signed at Springfield, Mass., this 3rd day of December, 1929.

CHARLES S. WEBBER.

Signed at Rochester, New York, this 6th day of December, 1929.

CYRIL J. STAUD.